United States Patent [19]

Dettmar

[11] Patent Number: 5,299,705

[45] Date of Patent: Apr. 5, 1994

[54] CUP FOR A CONTAINER AND AN ASSEMBLY OF CUP AND CONTAINER

[75] Inventor: Gary Dettmar, Braintree, Great Britain

[73] Assignee: Thermos Limited, Essex, United Kingdom

[21] Appl. No.: 65,921

[22] Filed: May 21, 1993

[30] Foreign Application Priority Data

May 22, 1992 [GB] United Kingdom ............... 9210922

[51] Int. Cl.5 ............................................ B65D 21/00
[52] U.S. Cl. ................................ 220/23.83; 220/23.86
[58] Field of Search .................... 220/23.83, 23.86, 521

[56] References Cited

U.S. PATENT DOCUMENTS

| | | | |
|---|---|---|---|
| 1,937,939 | 12/1933 | Behrens | 220/23.83 |
| 3,013,492 | 12/1961 | Sexton | 220/23.83 X |
| 3,348,716 | 10/1967 | Nakata | 220/23.86 X |
| 4,685,588 | 8/1987 | Kobayashi . | |
| 4,978,023 | 12/1990 | Behlmann et al. | 220/23.83 X |
| 5,086,926 | 2/1992 | Paige et al. | 220/23.83 X |

FOREIGN PATENT DOCUMENTS

| | | |
|---|---|---|
| 16778 | of 1902 | United Kingdom ............ 220/23.86 |
| 26157 | of 1907 | United Kingdom ............ 220/23.86 |
| 602185 | 5/1948 | United Kingdom . |
| 1579133 | 11/1980 | United Kingdom . |
| 2078094 | 1/1982 | United Kingdom . |

*Primary Examiner*—Steven M. Pollard
*Attorney, Agent, or Firm*—Todd S. Parkhurst

[57] ABSTRACT

A cup 1 and a container assembly including the cup 1 are predominantly moulded in plastics. The cup has a bowl 2 with a cylindrical portion 4 having a rim 5 and from which extends a conical portion 6. External flanges 20B and 21B are provided on the conical portion 6 and internal flanges 10 and 11 are provided on the portion 4 so that two cups 1 and 1A can be bayonet fitted together by engagement of the internal flanges 10, 11 of one cup with the external flanges 20B and 21B respectively of the other cup. Co-operation between an abutment face of the internal flange 11 and an external projection 30 provides stop means which reacts between the two cups to predetermine a rotational condition of the two cups. Securing means provided by co-operation of a stud 35 and dimple 36 between the two cups maintains the cups at said predetermined condition of rotation. The cup may have a handle 28 and when the stop means and securing means is effective the handles 8 of the two cups are in alignment.

A cup 1 engages as a bayonet fit on the container body 41 in an identical manner to the bayonet fit provided between the two cups 1 and 1A. The container 40 may have a handle 47 and securing means and stop means provided between the container and the cup fitted thereto (similarly to between the cups 1 and 1A) preferably locates the cup handles 8 and container handle 47 in alignment.

35 Claims, 8 Drawing Sheets

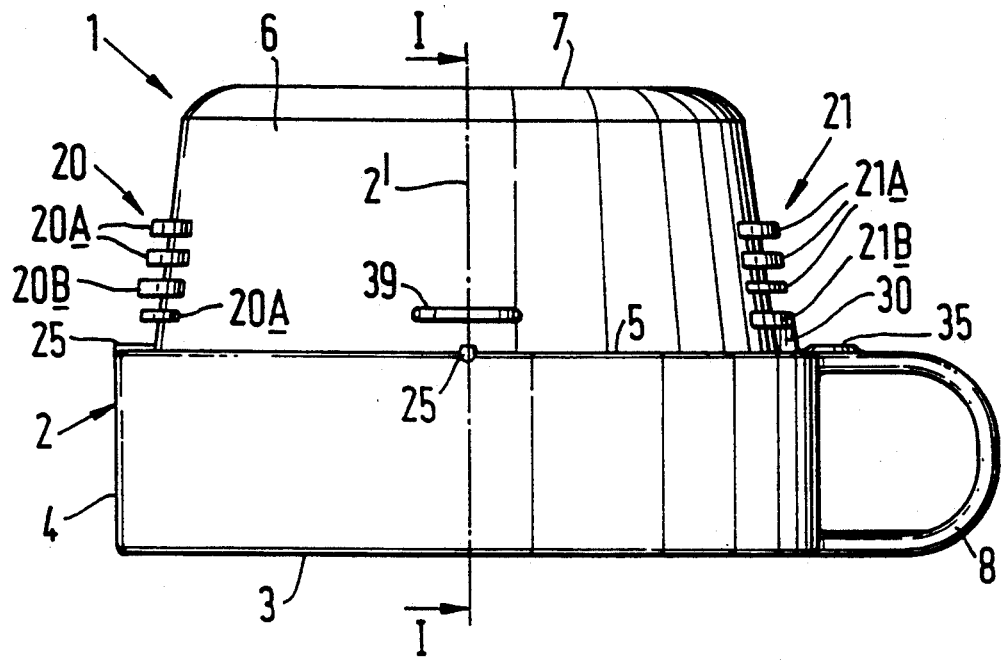
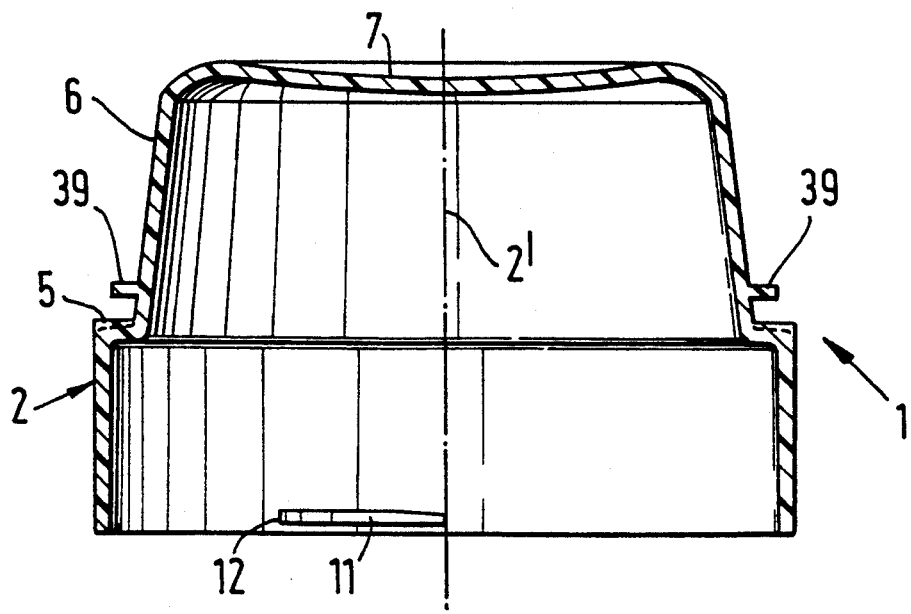

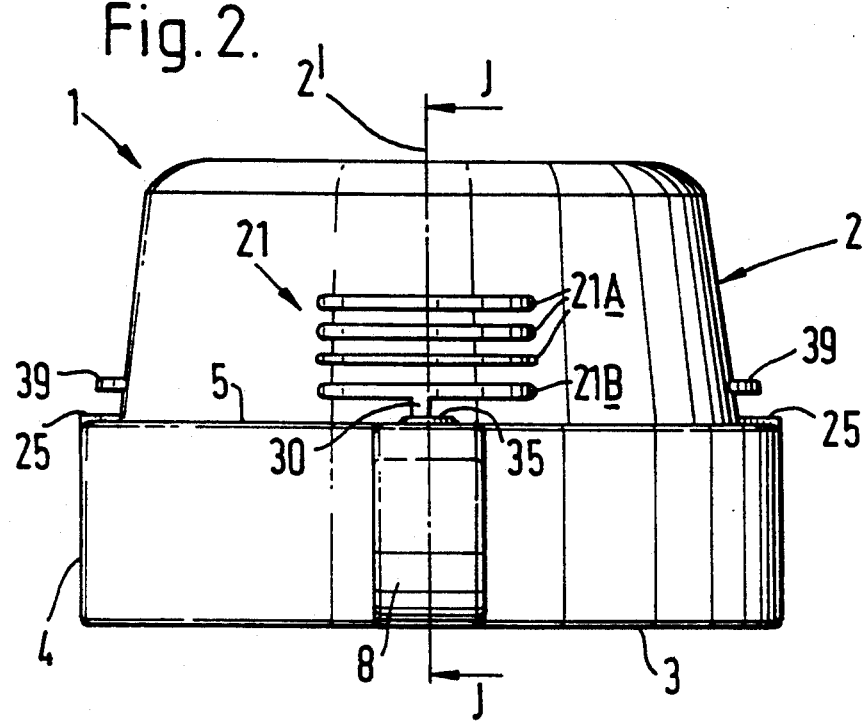
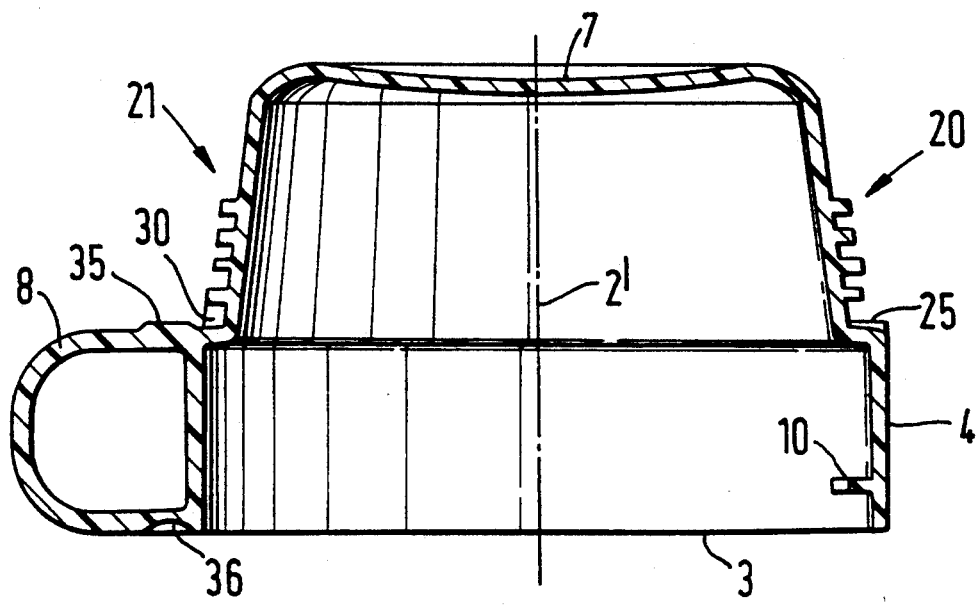

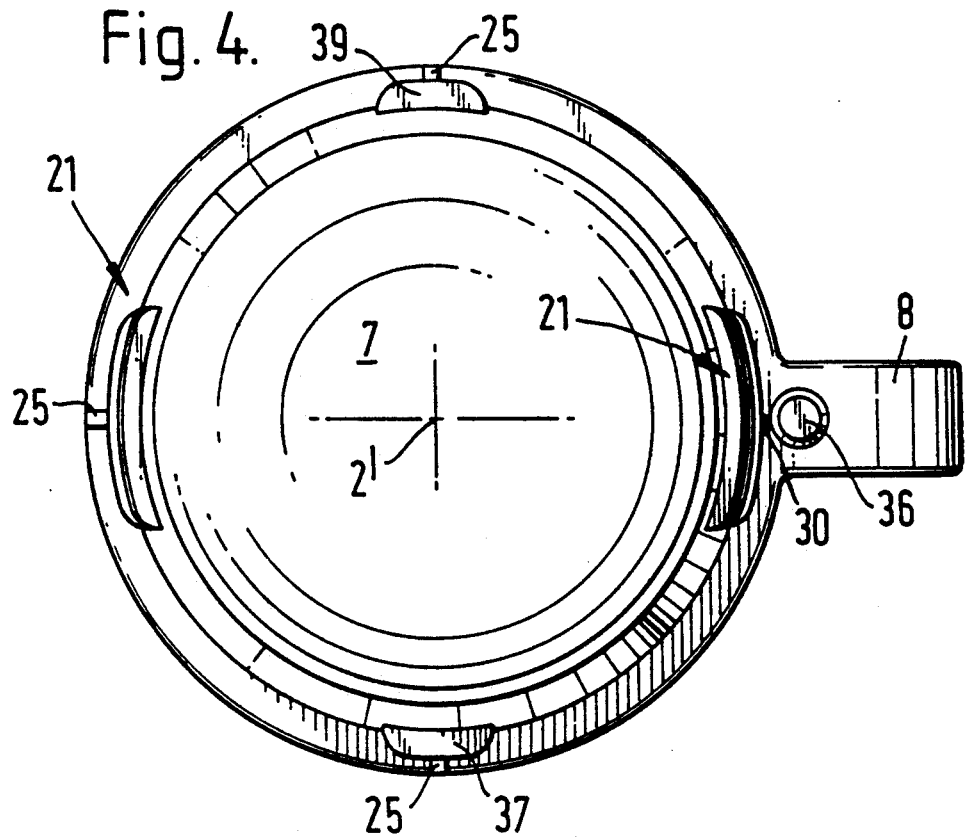
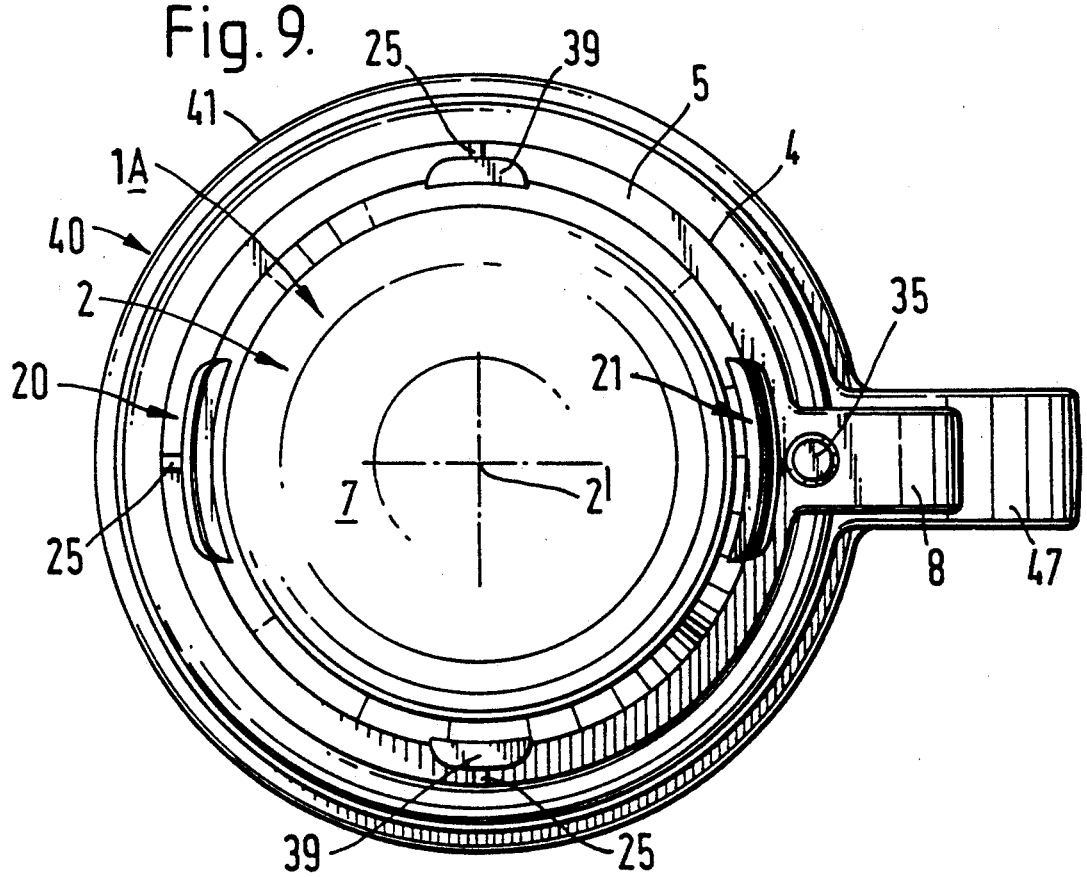

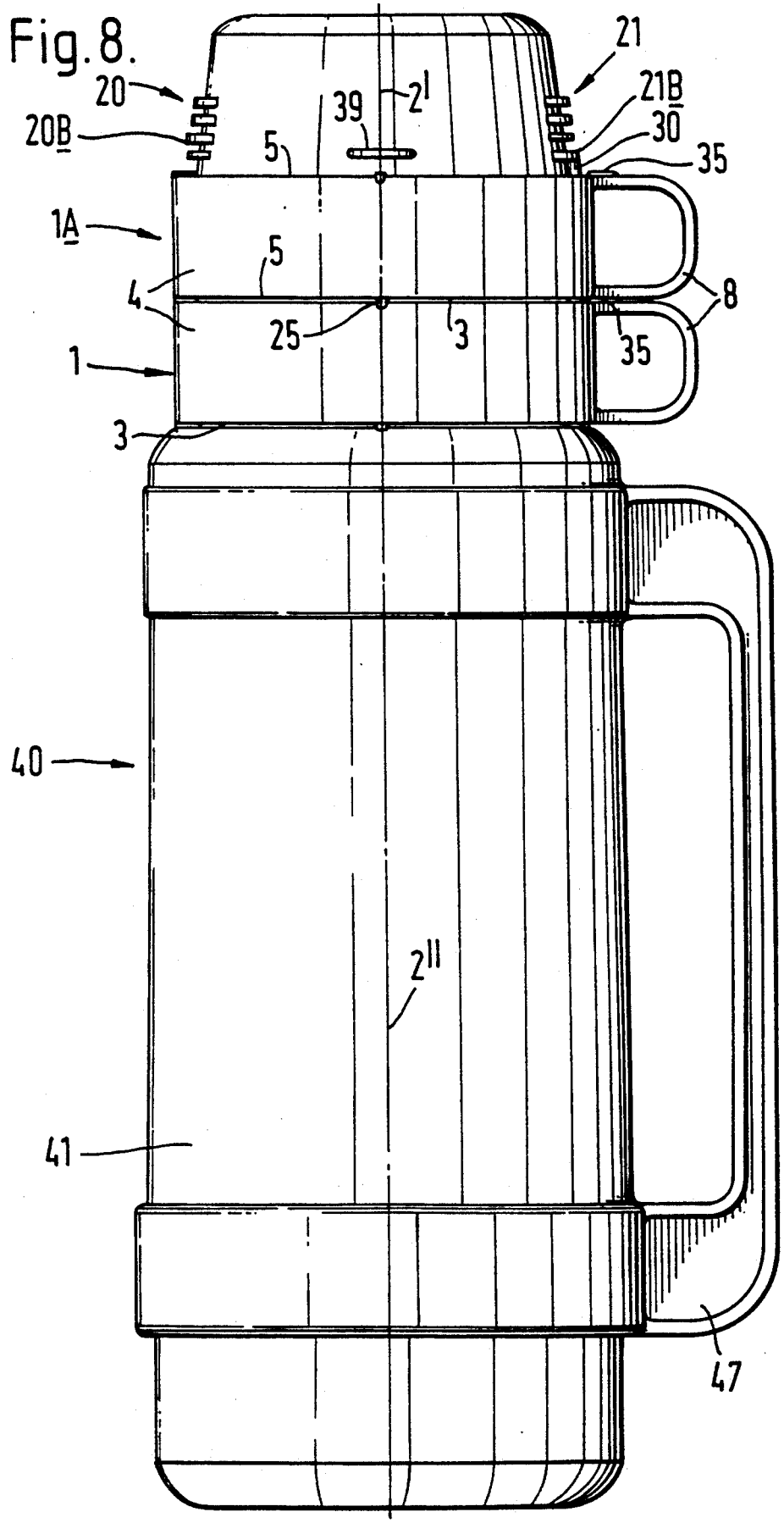

CUP FOR A CONTAINER AND AN ASSEMBLY OF CUP AND CONTAINER

TECHNICAL FIELD AND BACKGROUND ART

The present invention relates to a cup for a container and to an assembly of such a cup with a container.

It is well known for vacuum flasks and other containers to be provided with a drinking cup. Generally the container has an external shoulder forming a mouth which provides access to a storage cavity in the container and which shoulder is provided with an external screw thread to which can be fitted an inverted cup having a corresponding internal screw thread. The fitted cup provides a convenient cover for the mouth of the container (although the latter will usually be closed by a bung or stopper) thereby shielding the mouth and the interior of the cup from contamination and ensuring that the cup is conveniently and readily available for use. Furthermore, the screw threaded connection between the cup and container desirably provides a firm engagement in the event that a filled container is lifted or carried by its cup. This firm engagement is most desirable, especially with vacuum flasks having double walled glass insulating fillers which may be broken in the event that the flask is lifted by its cup and subsequently dis-engages from the cup to smash on the floor! A cup fitted to a container can also add considerably to the overall aesthetic design and marketing appeal which is of considerable importance for a commercially successful product. It has also been proposed to provide vacuum or other insulated containers for so-called leisure ware (especially containers having a relatively large capacity), with two cups where a relatively small cup is press fitted over the mouth of the container and a relatively larger cup is subsequently fitted over the small cup to accommodate it and to screw threadedly engage with the container. Naturally this arrangement is convenient for simultaneous consumption of the container contents by two people but it has the disadvantage that the different sized cups is somewhat discriminative and that the press-on inner cup may easily be mislaid or become loose within the screw fitted larger cup to provide an annoying rattle. Furthermore, when the small and larger cups are fitted to the container the presence of the inner cup is not readily apparent. It is an object of the present invention to provide a cup for a container and a container assembled with such a cup by which the disadvantages as indicated above of the prior proposals can be alleviated.

STATEMENTS OF INVENTION AND ADVANTAGES

According to the present invention there is provided a cup for a container comprising a bowl having a substantially central axis, first retaining means located within the bowl and extending from an internal face thereof, second retaining means located externally of the bowl and extending from an external face thereof, said first and second retaining means being arranged so that two said cups can be disposed and fitted together with the bowl of a first cup partly received axially within the bowl of the second cup and relative rotation between the two cups about said axis moves the first retaining means of the second cup into co-operation with the second retaining means of the first cup to firmly engage the two cups together and retain them against being separated axially.

Further according to the present invention there is provided an assembly of a cup as specified in the immediately preceding paragraph and a container, the container being provided with second retaining means corresponding to said second retaining means provided on the cup and said cup being fitted to the container with part of the container being received axially within the bowl of the cup and relative rotation between the cup and container about the cup axis moving the first retaining means of the cup into co-operation with the second retaining means of the container to firmly engage the cup and container together and retain them against being separated axially.

The present invention therefore envisages a cup structure whereby two or more identical cups may be stacked with their central axes substantially co-axial and with each cup firmly engaged and retained to the axially adjacent cup or cups by the respectively co-operating first and second retaining means between two adjacent cups. Furthermore, two or more such inter-engaging cups or even a single cup may be firmly engaged and retained on the container. Typically the container will have an external annular shoulder within which is formed a mouth opening to a cavity of the container and the second retaining means is located on the shoulder so that when the cup (or cups) is fitted to the container the mouth is covered by the cup. The container may therefore be fitted with one or more cups which firmly interengage with each other to ensure that there is no likelihood of the container inadvertently falling from the cups if the assembly is lifted by the cups. Furthermore, the number of cups fitted to the container is immediately apparent and the likelihood of misplacing or forgetting to add a cup for an additional person is alleviated. Commercially it is likely that cups will be available independently of the container so that additional cups may be purchased for a particular assembly as appropriate for the intended use of the container.

Preferably the first and second retaining means comprise flanges which extend part way about the periphery of the bowl and are arranged so that the first retaining means of the second cup co-operate as a bayonet fitting with the second retaining means of the first cup. Usually the first retaining means will have at least two flanges extending from the internal face of the bowl and spaced about the periphery of the bowl and the second retaining means will have at least two flanges extending from the external face of the bowl and spaced about the periphery of the bowl so that the internal flanges of the second cup co-operate as a bayonet fitting with respective external flanges of the first cup.

Because of the necessity for two identical cups to inter-engage through the first and second retaining means, it will be appreciated that the bowl of the first cup of the pair can only be received axially part-way within the bowl of the second cup in the pair because of the allowance which has to be made for the wall thickness of the cup. With this in mind it is preferred that the bowl has a shoulder in its external face spaced axially from a rim of the bowl and co-operation between the first and second retaining means of two cups biases the cups axially towards each other for the rim of the second cup to be urged towards abutment with the shoulder of the first cup as the latter is received within the bowl of the second cup. Typically the cups will be plastics mouldings and the aforementioned biasing will be provided by the resilience of the plastics material and appropriate profiling of the inter-engaging first and second retaining means. Although the rim of the second cup may be urged into abutment with the shoulder of the first cup which it receives, it is preferred that peripherally spaced small axially extending projections are located on the shoulder against which the rim of the second cup abuts when the two cups are in firm engagement so that a small gap is provided between the rim of the second cup and the shoulder of the first cup; it has been found that this alleviates the two cups from becoming "stuck" together by relatively long abutting surfaces extending continuously about the periphery of the cups and also alleviates the interengaging cups from "rocking" relative to each other.

Preferably the bowl is substantially circular in section perpendicular to its central axis although it will be appreciated that differently shaped sections are possible, for example a polygonal section can be used with the first and second retaining means appropriately profiled, possibly as arcuate flanges extending around the corners of the polygonal shape, to ensure that the required engagement is achieved between the first and second retaining means of the interfitting cups. In a preferred cup structure the rim of the bowl is located on a substantially cylindrical portion of the bowl and the bowl has a substantially frusto conical portion which is co-axial with and extends from the cylindrical portion to converge as it recedes from the cylindrical portion. A shoulder in the external face of the bowl as aforementioned may be formed between the cylindrical and frusto conical portions of the bowl with the first retaining means being located on the cylindrical portion of the bowl and the second retaining means being located on the frusto conical portion of the bowl. In this preferred structure the first retaining means may be formed by circumferentially spaced internal flanges each of which will usually be of part annular form to extend part-way about the internal circumference of the cylindrical portion of the bowl and the second retaining means may be formed by a corresponding number of circumferentially spaced external flanges which are conveniently of part annular form to extend part-way about the external circumference of the frusto conical portion. Conveniently the first retaining means comprises two diametrically opposed internal flanges and the second retaining means comprises two diametrically opposed external flanges. In bayonet fitting engagement between two identical cups, the external flanges of the first cup desirably co-operate, one each, with the respective internal flanges of the second cup within which the first cup is received. The internal flanges of the first retaining means may be located in a common radial plane of the cup and the external flanges of the second retaining means may also be located in a common radial plane different from that of the first mentioned radial plane. It is preferred however that the internal flanges are spaced axially from the rim at different distances and also that the external flanges are spaced axially from the rim at different distances which differences correspond to those of the internal flanges. Also that the radial depth of the flanges may differ one from another to ensure that in bayonet fitting co-operation between two cups, a predetermined internal flange of the second cup will engage with a particular and predetermined external flange of the first cup, the bowl of which is received within the second cup.

Stop means may be provided which reacts during relative rotation between two cups as they are being fitted together to restrain the cups from rotating relative to each other beyond a predetermined condition in which the first and second retaining means of the two cups co-operate to provide the firm engagement. The stop means may be formed by an internal projection on the internal face of the bowl and an external projection on the exterior of the bowl. These internal and external projections are disposed so that when the two cups are fitted together and rotated relative to each other the internal projection of the second cup abuts the external projection of the first cup (the bowl of which it receives) to restrain further relative rotation. Preferably the stop means serves to positively restrain the cups from rotating relative to each other beyond the predetermined condition during relative rotation between the cups in one sense of direction whilst during relative rotation between the cups in the opposite sense of direction the stop means may cause the material of the cups to flex for the two cups to be rotated relative to each other through the aforementioned predetermined condition. Flexure of the cups for this characteristic may easily be achieved by moulding the cups in appropriate plastics material. In a preferred arrangement the stop means is formed by an external projection on the exterior of the bowl and an abutment shoulder provided on a flange of the first retaining means so that when two cups are firmly engaged in their predetermined condition the abutment shoulder of the second cup abuts the external projection of the first cup (the bowl of which it receives). In this latter arrangement the flange of the first retaining means can be tapered about the periphery of the bowl so that during relative rotation between the two cups in the previously mentioned opposite sense of direction, the tapered flange can ride over the external projection causing the material of the cup to flex as the cups are relatively rotated through the predetermined condition. This arrangement for the stop means is convenient in use whereby it permits two cups to be fitted together and rotated relative to each other to a condition determined by the stop means when the relative rotation is in one sense of direction whereas if the two cups are fitted together and rotated relative to each other in the opposite sense of direction (which may be left handed rather than right handed) the cups may flex to trip over an abutment forming part of the stop means and in so doing rotate the two cups relative to each other into the predetermined condition.

Securing means may be provided which reacts during relative rotation between two cups being fitted together to secure the cups in a predetermined rotational orientation relative to each other. Where the cup is provided with the aforementioned stop means, it is preferred that the predetermined rotational orientation determined by the securing means coincides with the predetermined condition determined by the stop means. The securing means is primarily for restraining two cups which are firmly fitted together from inadvertently rotating relative to each other until such rotation is intended by manually gripping and rotating the cups relative to each other. The securing means may comprise frictionally engaging parts, such as an axially directed boss or stud and an axially directed dimple or recess which move into engagement with each other during relative rotation between the two cups and when the two cups are at the predetermined rotational orientation relative to each other.

The cup may have a handle extending outwardly of the bowl at a position where the handle will not interfere with the bowl being partly received within the bowl of a second cup to which it is fitted. Where the cup has a handle it is preferred that the aforementioned securing means and/or stop means when provided is arranged so that when two of the cups with handles are fitted together in firm engagement with each other, the handles of the two cups are substantially in alignment with each other extending axially of the cups. This characteristic may provide a particularly neat and aesthetically appealing presentation for several cups which are fitted together with their handles in axially extending alignment.

In the assembly of the cup and the container it will be appreciated that the second retaining means provided on the container will usually be structured to firmly engage with the first retaining means provided on the cup in an identical manner to that in which the second retaining means of one cup will firmly engage with the first retaining means of another cup within which it is partly received. Simplistically therefore the previously mentioned shoulder of the container on which the second retaining means will usually be located will conveniently have flanges and, when provided, relevant parts of stop means and securing means for co-operating with relevant parts of such means on a cup. The stop means may therefore react during relative rotation between the cup and container as they are being fitted together to restrain the cup and container from rotating relative to each other beyond a predetermined condition in which the first retaining means of the cup and the second retaining means of the container co-operate to provide the firm engagement. Also securing means may be provided which reacts during relative rotation between the cup and container as the cup is being fitted to secure the cup in a predetermined rotational orientation relative to the container. The container may be provided with a handle on the exterior thereof and in this case it is preferred that when securing means and/or stop means is provided, such securing means or stop means is arranged so that when the cup and container are fitted together in the predetermined condition or in the predetermined rotational orientation relative to each other, the handles of the cup and the container are substantially in alignment with each other extending axially of the cup.

DRAWINGS

One embodiment of a cup and an assembly of a cup and container constructed in accordance with the present invention will now be described, by way of example only, with reference to the accompanying illustrative drawings, in which:

FIG. 1 is a side elevation of the cup;

FIG. 2 is an end elevation of the cup;

FIGS. 3 and 4 are plan views of the cup from above and below respectively;

FIG. 5 is a section of the cup taken on the line J—J of FIG. 2;

FIG. 6 is a section of the cup taken on the line I—I of FIG. 1;

FIG. 8 is a side elevation of an assembly consisting of a container in the form of a vacuum flask and two cups as shown in FIG. 1 fitted to the container;

FIG. 9 is a plan view of the assembly shown in FIG. 8;

DETAILED DESCRIPTION OF DRAWINGS

Figure 3:
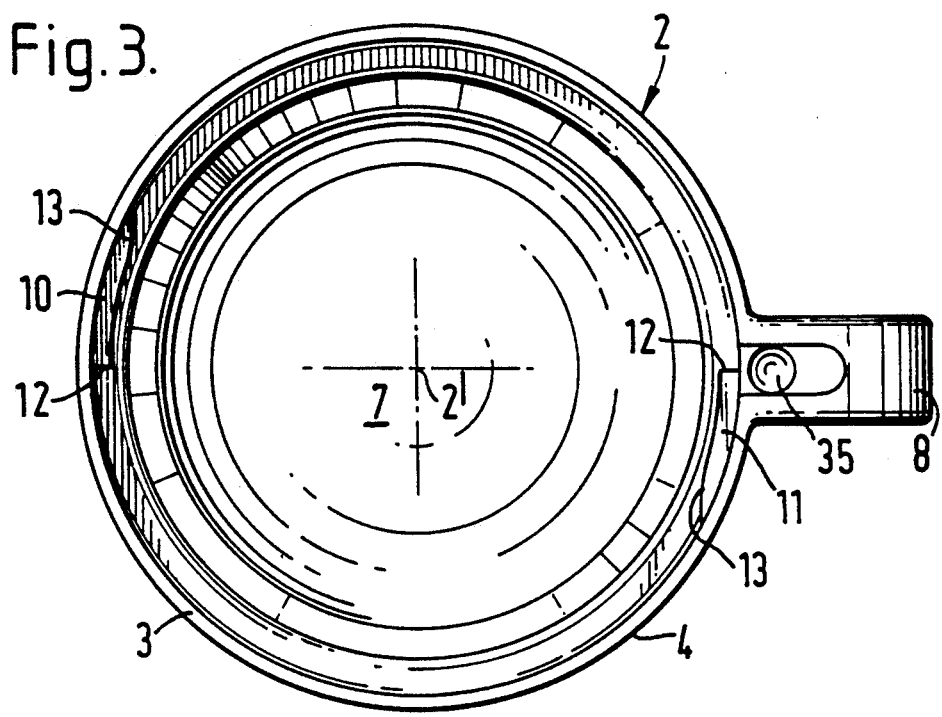

In FIGS. 1 to 6 a cup 1 is shown which is formed as a one piece moulding in plastics, typically polypropylene. The cup 1 has a bowl 2 with a central axis 2'. The bowl 2 has a circular rim 3 formed on a cylindrical portion 4 thereof co-axial with the axis 2'. The end of the cylindrical portion 4 axially remote from the rim 3 forms an annular external shoulder 5 which is directed axially of the bowl and from which extends a frusto conical portion 6 that is tapered to converge as it recedes axially from the shoulder 5. The frusto conical portion 6 is co-axial with the axis 2' and has an end wall 7 which forms a bottom to the cup 1.

The cup 1 includes a generally D-shaped handle 8 which is carried by the cylindrical portion 4 to be co-extensive therewith axially and to extend radially outwardly thereof. The handle 8 is located generally in a diametral plane which includes the axis 2' as will be seen from FIGS. 2 to 4.

Figure 7:
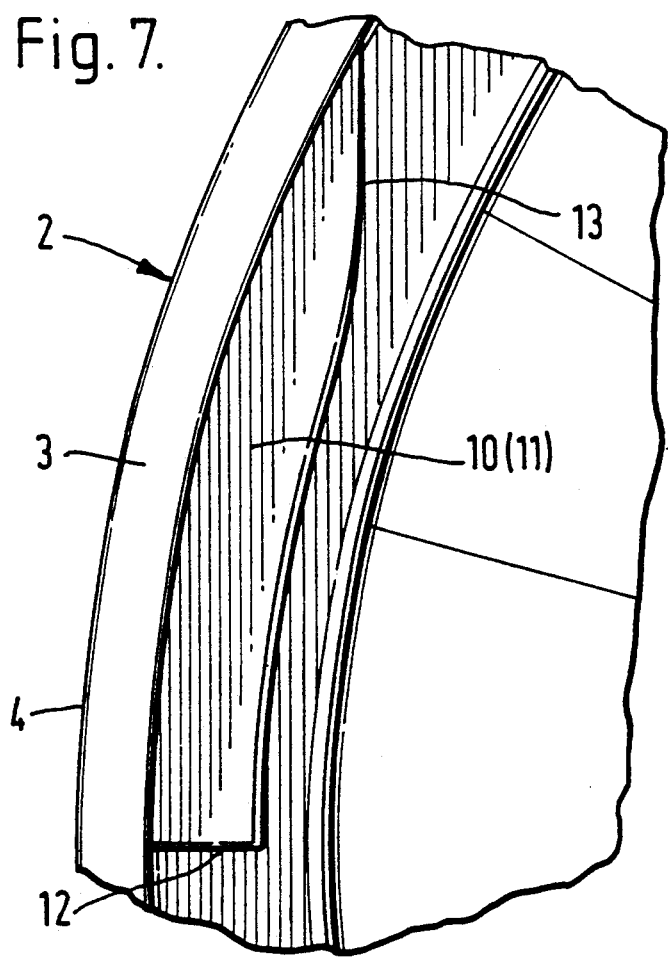
FIG. 7 is an enlarged detail of the cup shown in FIG. 3 particularly illustrating an internal flange forming part of first retaining means of the cup.

Located within the bowl 2 and projecting from the interior surface of its cylindrical portion 4 adjacent to the rim 3 are a pair of radially inwardly extending and diametrically opposed flanges 10 and 11 (see FIG. 3). The flanges 10 and 11 are similarly formed as generally part annular profiles located in radial planes of the cylindrical portion 4. Each flange 10, 11 has a radially extending abutment shoulder 12 (see FIG. 7) and a lead-in face 13 by which the radial depth of the flange tapers to the inner surface of the cylindrical portion 4. As will be seen from FIG. 3 the abutment shoulders 12 of the two flanges are located in a common diametral plane of the cylindrical portion 4 and the flanges 10 and 11 extend from that plane in the same circumferential direction. As will also be seen from FIGS. 5 and 6, the internal flanges 10 and 11 are located on the cylindrical portion 4 of the bowl at different axial distances from the rim 3, in particular the flange 11 is axially nearer to the rim 3 than the flange 10.

Located on the exterior surface of the frusto conical portion 6 are two sets of diametrically opposed external flanges 20 and 21. The flanges in each set are spaced axially of the bowl 2 and are of substantially part-annular profile extending in radial planes of the bowl. These external flanges 20 and 21 present an aesthetically pleasing appeal to the cup and provide heat insulation between the bowl and the free ends of the flanges, for example to alleviate discomfort if the cup contains hot liquid and is lifted by holding against the free ends of the opposed sets of flanges 20 and 21. In the set of flanges 20 those indicated at 20A may be regarded as being present solely for aesthetic and insulation purposes and in the set of flanges 21 those indicated at 21A may be regarded as being present solely for aesthetic and insulation purposes. The remaining external flange 20B in the set 20 and the remaining external flange 21B in the set 21 are diametrically opposed but spaced at axially different distances from the face presented by the external annular shoulder 5 on the cylindrical portion 4 of the bowl. More particularly the external flanges 20B and 21B are intended to engage with the internal flanges 10 and 11 respectively in providing bayonet fitting engagement between two identical cups 1 and consequently the internal flanges 10 and 11 are provided with the different axial spacings from the rim 3.

Figure 10:
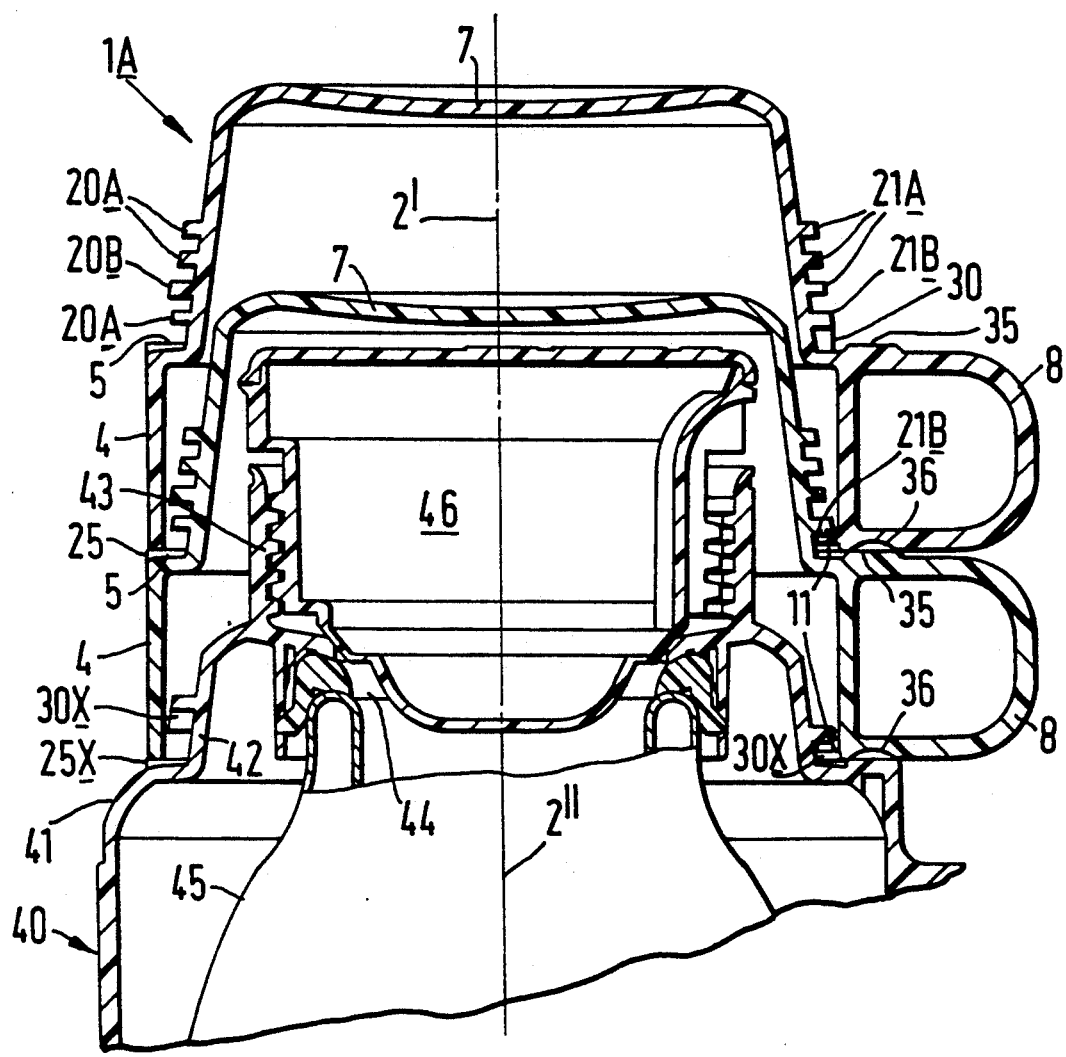
FIG. 10 is an axial section of part of the assembly shown in FIG. 8.

In fitting two identical cups 1 and 1A together as shown in FIGS. 9 and 10, the frusto conical portion 6 of the cup 1 is received axially within the cylindrical portion 4 of the cup 1A as the rim 3 of the cup 1A moves towards abutment with the shoulder 5 of the cup 1 and with the handles 8 of the two cups out of axial alignment with each other. When the rim 3 of the cup 1A substantially abuts the shoulder 5 of the cup 1 the cups are rotated relative to each other about their co-axial axes 2' to a position in which the internal flange 10 of the cup 1A axially underlies the external flange 20B of the cup 1 and the internal flange 11 of the cup 1A simultaneously axially underlies the external flange 21B of the cup 1 to effect the bayonet fitting engagement between the two cups. The external flanges in the sets 20 and 21 may be of different radial depths to ensure that those flanges which are present for aesthetic purposes only do not interfere with the flanges which are operational in effecting the bayonet fitting engagement. Preferably the rim 3 of the cup 1A does not make face-to-face contact with the shoulder 5 of the cup 1 and to alleviate this the shoulder 5 has a circumferentially spaced array of small axially extending projections 25 on which the rim 3 of the cup 1A is firmly supported. The co-operation between the internal flanges 10 and 11 and the external flanges 20B and 21B of the inter-engaging cups 1 and 1A may bias the two cups axially towards each other for the rim 3 of the cup 1A to firmly abut against the small projections 25 and the aforementioned internal and external flanges can be profiled and dimensioned accordingly to provide the biasing which may be considered appropriate.

Extending between the external flange 21B and the shoulder 5 is a web or radially outwardly extending projection 30. This projection 30 is intended to provide a stop against which the abutment shoulder 12 of the flange 11 abuts as that flange on the cup 1A moves into engagement beneath the external flange 21B and between that flange and the shoulder 5 of the cup 1 during bayonet fitting of the two cups together. Consequently the abutment of the shoulder 12 on the flange 11 of cup 1A with the projection 30 of the cup 1 is intended to restrain the cups from rotating relative to each other when those cups have been rotated in their bayonet fitting to a predetermined condition relative to each other. From the arrangement of the internal flanges 10 and 11 as previously discussed with reference to FIGS. 3 and 7 it will be seen that if the cups 1 and 1A are rotated relative to each other during their bayonet fitting in one sense of direction the abutment shoulder 12 of the flange 11 on cup 1A will move directly into abutment with the projection 30 on the cup 1. Alternatively however if the cups 1 and 1A are rotated in the opposite sense of direction relative to each other so that the lead-in surface 13 of the internal flange 10 or 11 on the cup 1A leads towards the projection 30 on the cup 1, it will be seen that the lead-in surface 13 will cause the flange 10 or 11 on the cup 1A to ride over the projection 30 whilst the bowl of the cup 1A undergoes a temporary distortion (as permitted by the plastics material); as a consequence of this latter characteristic the flange 11 may effectively snap engage as it jumps over the projection 30 to move its abutment face 12 into abutment with the projection 30 in the aforementioned predetermined condition (although a slight reverse in rotation between the cups may be necessary to achieve the aforementioned abutment). The condition predetermined by abutment of the face 12 of the flange 11 on the cup 1A with the stop projection 30 of the cup 1 coincides with the handles 8 of the two cups 1 and 1A being in alignment axially of the cups so that the two handles are located in a plane which includes their coaxial axes 2'.

Formed on the handle of the cup is a small circular stud 35 which projects axially of the bowl on the side of the handle remote from the rim 3 and adjacent to the shoulder 5. Also formed in the handle 8 on the side thereof adjacent to the rim 3 and in alignment with the stud 35 parallel to the axis 2' is a recess in the form of a circular dimple 36. The stud 35 and dimple 36 are intended to provide securing means between inter-engaging cups so that when the two cups 1 and 1A are firmly engaged with their bayonet fitting, the projection 35 of the cup 1 moves into engagement with the dimple 36 of the cup 1A at a predetermined rotational orientation between the two cups. In FIG. 10 the stud 35 of the cup 1 is shown in frictional engagement with the dimple 36 of the cup 1A and this engagement provides a temporary lock or restraint to the two cups being unintentionally rotated out of engagement with each other. In the present embodiment the stud 35 of the cup 1 co-operates with the dimple 36 of the cup 1A at a position coinciding with the previously mentioned predetermined condition where the handles 8 are in alignment with each other in a plane which includes the axes 2' and when the shoulder 12 of the flange 11 on the cup 1A abuts the projection 30 of the cup 1.

From the aforegoing description it will be appreciated that radial clearance will be provided between major arcuate part lengths of the inner surface of the cylindrical portion 4 of the bowl 2 of the cup 1A and the external face of the frusto conical portion of the bowl of the cup 1 which is received within the cup 1A. Bearing in mind that the cups will usually be moulded with relatively thin walls it is possible that the aforementioned radial clearance could permit radial distortion in the cylindrical wall portion of the cup 1A whilst in engagement with the cup 1. To alleviate this the cup is provided with support projections 39 which are circumferentially spaced to project from the external surface of the frusto conical portion 2 of the bowl. These support projections 39 are arranged so that when the two cups 1 and 1A are fitted together, the support projections 39 of the cup 1 are closely received within the cylindrical portion 4 of the cup 1A to support the cylindrical portion 4 of the cup 1A against distortion radially inwardly of its axis 2'.

A container 40 to which the cups are fitted is shown in FIGS. 8 to 12 and comprises a plastics moulded body 41 of generally cylindrical structure which tapers at its upper end to provide an annular shoulder 42 carrying an annular neck 43 which forms a top opening 44. Housed within the body 41 is a conventional filler 45 in the form of a glass double wall vacuum insulated bottle, the storage cavity of which is in sealed communication with the mouth 44. The filler 45 and its disposition within the body 41 is not relevant to the present invention although, for convenience, a stopper 46 has been shown in FIG. 10 in screw threaded engagement with the neck 43 to close the mouth 44. The container 40 has a handle 47 which projects from the body 41 and extends longitudinally of the body in a plane which includes the axes 2" of the cylindrical body.

Figure 11:
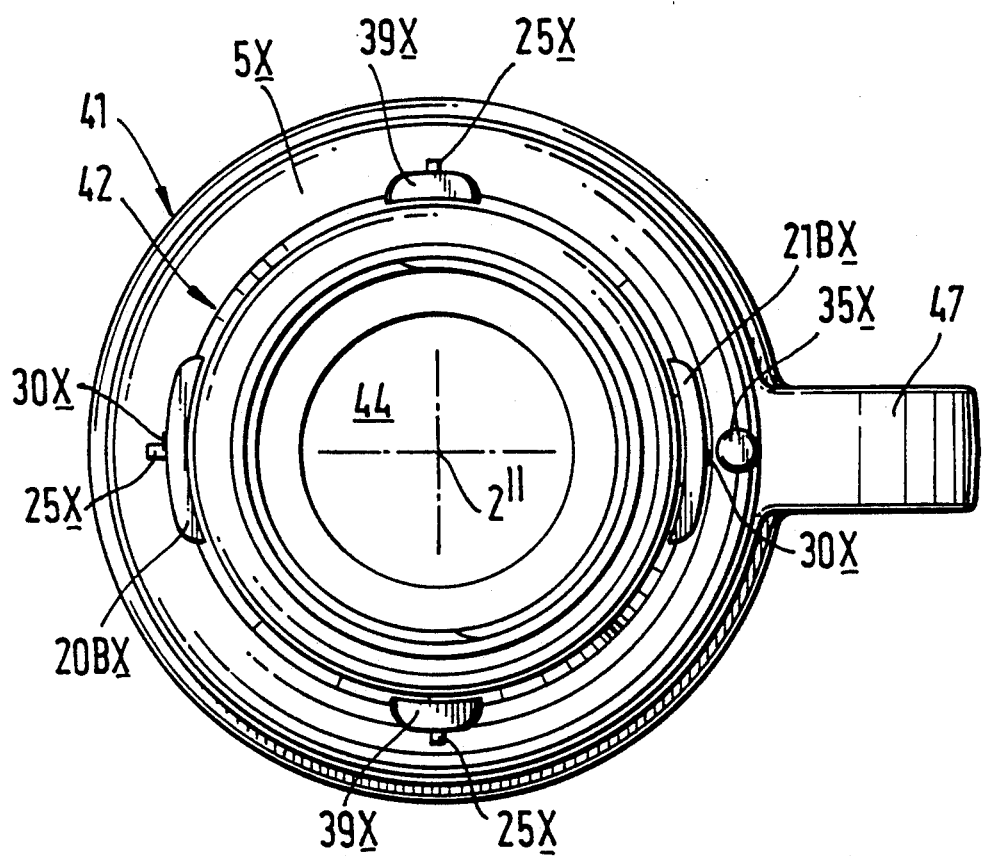
FIG. 11 is a plan view of the container with the cups removed.
Figure 12:
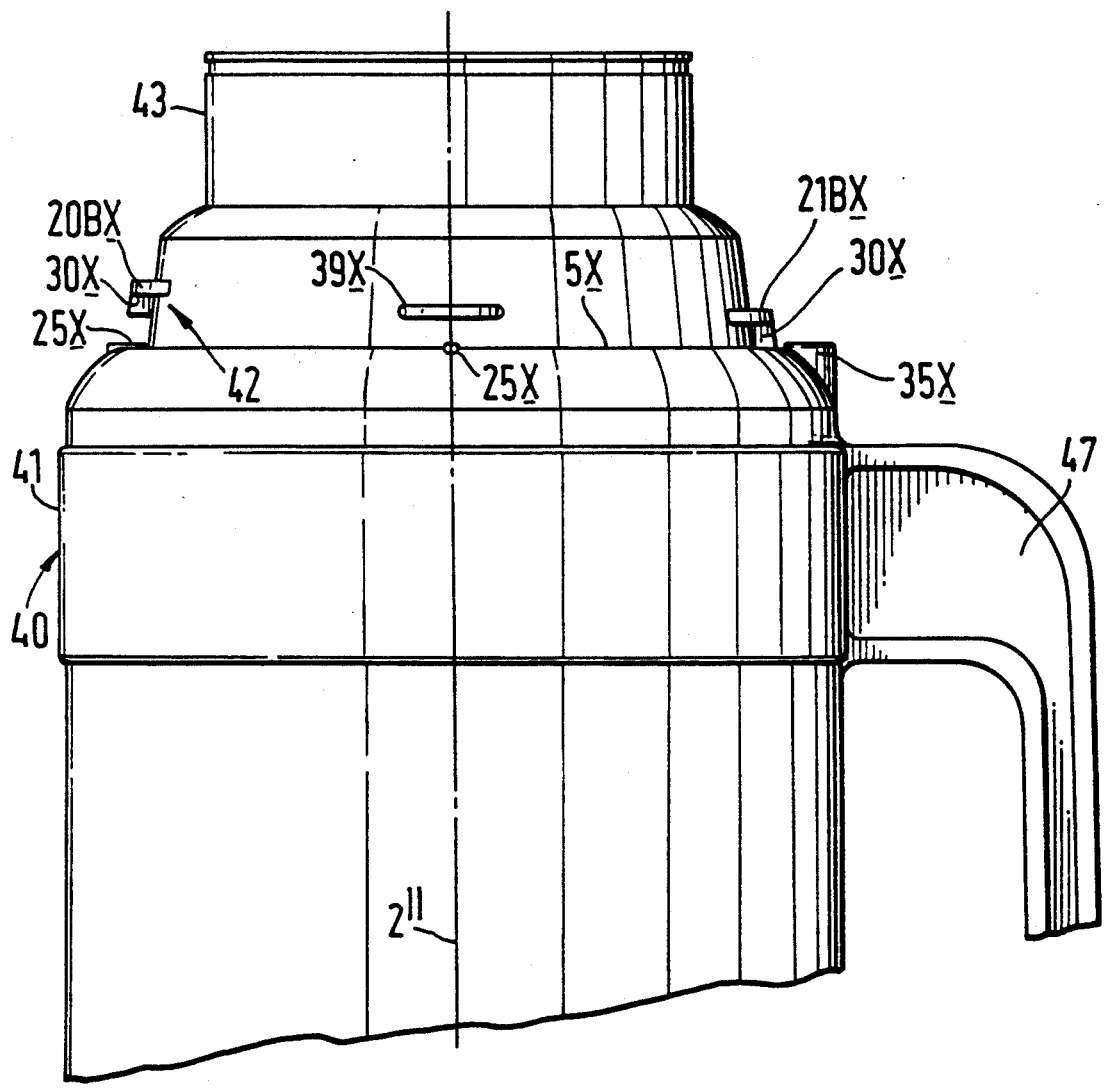
FIG. 12 is a side elevation of an upper part of the container with the cups removed.

Referring to FIGS. 11 and 12 it will be seen that the shoulder 42 on the upper portion of the container body 41 is formed to correspond, in substance, with the external profile presented by the shoulder 5 and axial projections 25, stud projection 35, support projections 39, bayonet fitting flanges 20B and 21B and stop projection 30 on the cup. For convenience those parts on the container body 41 which correspond to parts on the cup have been shown with the same references followed by the prefix X. It will be noted from FIG. 12 that there are no external flanges corresponding to the flanges 20A and 21A on the cup bowl (as these are considered unnecessary for aesthetic purposes on the shoulder of the container body) and that a second stop projection 30X has been provided beneath the external flange 20BX so that the two stop projections 30X are diametrically opposite each other but in different radial planes. Because of the similar disposition of the parts indicated by the reference numbers followed by the suffix X on the container body to the correspondingly numbered parts on the cup, the cup 1 is engaged with the container 40 as a bayonet fit in identical manner to that previously described for engagement between the cups 1 and 1A (although the two abutment shoulders 12 of the flanges 10 and 11 of the cup will abut, one each, the two projections 30X). Furthermore the projections 30X and stud 35X are located on the container body 41 so that when the cup 1 is firmly engaged with the container body so that its abutment faces 12 on the internal flanges 10 and 11 abut the projections 30X and its dimple 36 engages with the stud 35X to restrain the cup from rotating relative to the container body, the cup handle 8 is in alignment with the container handle 47 as shown in FIGS. 8 and 9 so that both or all of the handles in the assembly are in alignment in a plane which includes the co-axial axes 2' of the cup(s) and the container body.

Although the preferred embodiment refers to an insulated container it will, of course, be realised that the invention is not intended to be restricted to such containers.

I claim:

1. A cup for a container comprising a bowl having a substantially central axis, first retaining means located within the bowl and extending from an internal face thereof, second retaining means located externally of the bowl and extending from an external face thereof, said first and second retaining means being arranged so that two said cups can be disposed and fitted together with the bowl of a first cup partly received axially within the bowl of the second cup and relative rotation between the two cups about said axis moves the first retaining means of the second cup into co-operation with the second retaining means of the first cup to firmly engage the two cups together and retain them against being separated axially.

2. A cup as claimed in claim 1 in which the first retaining means and second retaining means comprise flanges extending part way about the periphery of the bowl and arranged so that the first retaining means of the said second cup co-operates as a bayonet fitting with the second retaining means of the said first cup.

3. A cup as claimed in claim 2 in which the first retaining means comprises at least two flanges extending from the internal face of the bowl and spaced about the periphery of the bowl and the second retaining means comprises at least two flanges extending from the external face of the bowl and which flanges are arranged so that the internal flanges of the said second cup co-operate with said bayonet fitting with respective external flanges of the said first cup.

4. A cup as claimed in claim 1 in which the bowl has a shoulder in its external face spaced axially from a rim of the bowl and co-operation between the first and second retaining means of two said cups biases the two cups axially relative to each other for the rim of the second cup to be urged towards abutment with the shoulder of the first cup.

5. A cup as claimed in claim 4 in which the rim is located on a substantially cylindrical portion of the bowl and said bowl has a substantially frusto conical portion which is co-axial with and extends from the cylindrical portion, said frusto conical portion tapering to converge as it recedes axially from the cylindrical portion, and wherein said shoulder in the external face of the bowl is formed between its cylindrical and frusto conical portions, the first retaining means is located on the cylindrical portion and the second retaining means is located on the frusto conical portion.

6. A cup as claimed in claim 5 in which the bowl carries a handle which projects from the cylindrical portion of the bowl.

7. A cup as claimed in claim 4 in which peripherally spaced axially extending projections are located on the shoulder against which the rim of the second cup abuts when the two cups are firmly retained together.

8. A cup as claimed in claim 1 in which the bowl part is substantially circular in section perpendicular to its central axis.

9. A cup as claimed in claim 5 in which the first retaining means comprises circumferentially spaced internal flanges, each of which extends part way about the internal circumference of the cylindrical portion of the bowl and the second retaining means comprises circumferentially spaced external flanges which correspond in number to the internal flanges and each of which extends part way about the external circumference of the frusto conical portion so that in said engagement between two said cups the external flanges of the first cup co-operate as a bayonet fitting one each with the respective internal flanges of the second cup.

10. A cup as claimed in claim 9 in which the first retaining means comprises two diametrically opposed internal flanges and the second retaining means comprises two diametrically opposed external flanges.

11. A cup as claimed in claim 9 in which the internal flanges are spaced axially from the rim at different distances and the external flanges are spaced axially from the rim at different distances and the external flanges are spaced axially from the rim at distances which correspond to those of the internal flanges so that during bayonet fitting engagement between the two said cups a predetermined internal flange of the second cup will engage with a particular and predetermined external flange of the first cup.

12. A cup as claimed in claim 1 and comprising stop means which reacts during relative rotation between the two said cups during their engagement to restrain said cups from rotating relative to each other beyond a predetermined condition in which the first and second retaining means of the two cups co-operate to provide said engagement.

13. A cup as claimed in claim 12 in which the bowl carries a handle and the stop means is arranged so that when the two said cups are fitted together the restraint provided by the stop means is effective at a position in which the handles of the two cups are substantially in alignment with each other extending axially of the cups.

14. A cup as claimed in claim 12 in which the stop means comprises an internal projection on the internal face of the bowl and an external projection on the exterior of the bowl, said internal and external projections being disposed so that when two said cups are fitted together and rotated relative to each other the internal projection of the second cup abuts the external projection of the first cup to restrain further relative rotation.

15. A cup as claimed in claim 12 in which the stop means positively restrains said two cups from rotating relative to each other beyond the predetermined condition during relative rotation between the cups in one sense of direction and during relative rotation between the cups in the opposite sense of direction, the stop means causes the material of at least one of the cups to flex for the two cups to be rotated relative to each other through said predetermined condition.

16. A cup as claimed in claims 12 in which the first retaining means and second retaining means comprise flanges extending part way about the periphery of the bowl and arranged so that the first retaining means of the said second cup co-operates as a bayonet fitting with the second retaining means of the said first cup; and wherein the stop means comprises an external projection on the exterior of the bowl and an abutment shoulder formed on a flange of the first retaining means arranged so that when said two cups are firmly engaged the abutment shoulder of the said second cup abuts the external projection of the said first cup.

17. A cup as claimed in claim 16 in which the stop means positively restrains said two cups from rotating relative to each other beyond the predetermined condition during relative rotation between the cups in one sense of direction and during relative rotation between the cups in the opposite sense of direction, the stop means causes the material of at least one of the cups to flex for the two cups to be rotated relative to each other through said predetermined condition; and wherein said flange of the first retaining means is tapered about the periphery of the bowl so that during said relative rotation between the said two cups in the opposite sense of direction said tapered flange can ride over the external projection causing the material of the cup to flex as the cups are relatively rotated through said predetermined condition.

18. A cup as claimed in claim 1 and comprising securing means which reacts during relative rotation between the two said cups to secure said cups in a predetermined rotational orientation relative to each other.

19. A cup as claimed in claim 18 in which the bowl carries a handle and said securing means is arranged so that when the two said cups are fitted together in the predetermined rotational orientation relative to each other the handles of the two cups are substantially in alignment with each other extending axially of the cups.

20. A cup as claimed in claim 19 and comprising securing means which reacts during relative rotation between the two said cups to secure said cups in a predetermined rotational orientation relative to each other; said securing means comprising an axially directed boss or stud and an axially directed recess or dimple which move into engagement with each other during said relative rotation between the two said cups and when said cups are at the predetermined rotational orientation relative to each other; and wherein the boss or stud and recess or dimple are located substantially on the handle, one of the stud and dimple being positioned on the side of the handle adjacent to the rim of the bowl and the other being positioned on the side of the handle remote from the rim.

21. A cup as claimed in claim 18 in which the securing means comprises an axially directed boss or stud and an axially directed recess or dimple which move into engagement with each other during said relative rotation between the two said cups and when said cups are at the predetermined rotational orientation relative to each other.

22. A cup as claimed in claim 1 in which the bowl carries a handle.

23. A cup as claimed in claim 1 in which the bowl of the cup has support projections peripherally spaced about its external surface and which are arranged so that when the two said cups are fitted together the support projections of the first cup are closely received within the bowl of the second cup to support the bowl of the second cup against distortion radially inwardly of its central axis.

24. An assembly of two cups each as claimed in claim 1 when fitted together in said firm engagement with the first retaining means of the said second cup co-operating with the second retaining means of the said first cup.

25. An assembly of a cup as claimed in claim 1 and a container, the container being provided with second retaining means corresponding to said second retaining means provided on the cup and said cup being fitted to the container with part of the container being received axially within the bowl of the cup and relative rotation between the cup and container about the cup axis moves the first retaining means of the cup into co-operation with the second retaining means of the container to firmly engage the cup and container together and retain them against being separated axially.

26. An assembly as claimed in claim 25 in which the part of the container which is received within the bowl of the cup has support projections spaced about its periphery, said support projections on the container being closely received within the bowl of the cup to support that bowl against distortion radially inwardly of its central axis.

27. An assembly as claimed in claim 25 in which the container has an external shoulder within which is formed a mouth opening to a storage cavity of the container, said second retaining means being located on said shoulder of the container so that the cup fitted to the container covers the mouth.

28. An assembly as claimed in claim 27 in which the shoulder is annular to substantially correspond with a circular section of the bowl part within which the shoulder is partly received.

29. An assembly as claimed in claim 25 and comprising stop means which reacts during relative rotation between the cup and container on being fitted together to restrain the cup and container from rotating relative to each other beyond a predetermined condition in which the first retaining means of the cup and the second retaining means of the container co-operate to provide said firm engagement.

30. An assembly as claimed in claim 27 in which the container has a handle on the exterior thereof and wherein the stop means is arranged so that when the cup is fitted to the container the restraint provided by the stop means is effective at a position in which a handle of the cup and said handle on the container are substantially in alignment with each other extending axially of the cup.

31. An assembly as claimed in claim 29 in which the stop means comprises an external projection on the exterior of the container, said internal projection on the cup and said external projection on the container being disposed so that when said cup and container are fitted together and rotated relative to each other, the internal projection of the cup abuts the external projection of the container to restrain further relative rotation.

32. An assembly as claimed in claim 25 in which a securing means is provided which reacts during relative rotation between the cup and container to secure the cup in a predetermined rotational orientation relative to the container.

33. An assembly as claimed in claim 32 in which the said securing means comprises an axially directed boss or stud or recess or dimple on the container which moves into frictional engagement with an axially directed recess or dimple or boss or stud respectively provided on the cup when the cup and container are at the predetermined rotational orientation relative to each other.

34. An assembly as claimed in claim 32 in which the container has a handle on the exterior thereof and wherein the said securing means is arranged so that when the cup and container are fitted together in the predetermined rotational orientation relative to each other the handles of the cup and container are substantially in alignment with each other extending axially of the cup.

35. An assembly as claimed in claim 25 in which the container has a handle on the exterior thereof.

* * * * *